No. 748,851.

Patented January 5, 1904.

UNITED STATES PATENT OFFICE.

ROBERT KENNEDY DUNCAN, OF WASHINGTON, PENNSYLVANIA, ASSIGNOR TO DUNCAN CHEMICAL COMPANY, A CORPORATION OF PENNSYLVANIA.

MATERIAL FOR PRODUCING DESIGNS, ORNAMENTATIONS, OR LETTERS ON ARTICLES.

SPECIFICATION forming part of Letters Patent No. 748,851, dated January 5, 1904.

Application filed January 6, 1903. Serial No. 138,065. (No specimens.)

*To all whom it may concern:*

Be it known that I, ROBERT KENNEDY DUNCAN, of Washington, in the county of Washington and State of Pennsylvania, have invented certain new and useful Improvements in Material for Producing Designs, Ornamentations, or Letters on Articles; and I do hereby declare the following to be a full, clear, and exact description of the invention, such as will enable others skilled in the art to which it appertains to make and use the same.

My invention relates to an improved material for producing designs, ornamentations, or letters on articles.

The object of the invention is to provide a low-fusing material which may be cheaply and expeditiously applied to articles made of glass or similar material and produce thereon any desired ornamentation, decoration, or lettering which will be vitreous, brilliant, and of any desired tint or color, practically insoluble in hot or cold water, and capable of withstanding ordinary variations of temperature without being cracked or injured.

With this object in view my invention consists in a compound of lead oxid and boric acid in substantially the proportions hereinafter set forth.

My invention further consists in certain other features of improvement, which will be hereinafter described, and pointed out in the claims.

The improved material, which I have designated as "lead subborate," is made by fusing at a low temperature a mixture of a compound of lead, such as litharge or red lead or lead nitrate, with boric acid, either fused or crystalline, or the material can be made by precipitation. I have used all of the above substances and have ascertained that they are preferably used in approximately the following proportions: litharge, (PbO,) 111.5, or red lead, ($Pb_3O_4$,) 113.8 or, lead nitrate, $Pb(NO_3)_2$, 165.5, mixed with boric acid, crystalline, ($H_3BO_3$,) thirty-one, or boric acid, fused, ($B_2O_3$,) 17.5. These substances mixed in the foregoing equivalent proportions yield an identical result, with this exception that when lead nitrate is used the color of the resulting product is somewhat improved.

Instead of using only one of the lead compounds referred to two of them may be mixed and used with advantage. Thus a mixture may be employed which consists of lead nitrate, 17.5; litharge, one hundred, and boric acid, (crystalline,) thirty-one. The lead subborate produced by the fusion of any one of these several mixtures consists of a transparent, highly-refractive, yellow-tinted, glass-like mass and almost colorless in thin layers. It has, however, an extraordinary power of dissolving coloring materials—as, for example, metallic oxids—and the resultant may then present a very beautiful color. These coloring materials may be mixed with a "batch" of the lead subborate before fusion, or they may be mixed with the powdered borate and then fused therewith, or they may be mixed with the lead subborate as it lies fused in the pot.

The amount and kind of coloring-matter that is employed will depend on the kind and depth of color that may be desired. For example, the following proportions may be used for the production of blue ornamentation or lettering: litharge, one hundred and twelve; boric acid, thirty-four; cobalt carbonate, 2.6; nickle oxid, 0.1. For the production of emerald-green ornamentation, figures, or letters the following proportions may be employed: lead nitrate, 165.5; boric acid, thirty-three; cupric oxid, 3.2, and chromium oxid, 0.08.

Other colors—such as black, claret, copper, &c.—may be produced by using suitable inorganic oxids and salts. To produce an opaque enamel, the lead subborate is mixed with the oxids of antimony, arsenic, tin, &c., in the proper proportions. By mixing the enameling substance with the coloring substances an opaque colored enamel is produced. For example, the oxids of copper and cobalt mixed with the oxid of arsenic in the proper proportions will produce a turquoise enamel.

By very careful heating of the lead subborate it is possible to make it take the enamel condition without the necessity of adding any of the enameling-oxids, such as antimony, arsenic, &c.

Any one of the above-named mixtures of lead subborate and coloring material is put into a crucible which is highly refractory, and the crucible is then heated to a degree as low as possible to bring about a proper fusion of the mixture. The temperature is about that of a low red heat. The fused mixture is poured from the crucible in a thin stream into cold water, with the result that it quickly solidifies and is transformed into a granulated powder. The granular powder is drained and dried and is then reduced to a fine impalpable powder in an agate mortar or by means of a mill employing agate rollers. The use of an iron mortar or iron rollers is objectionable, because the hard borate would under such conditions take up enough of the iron to ruin its color. Hence a mortar or rollers made of agate or equivalent material should be employed for this purpose.

The lead subborate is vitreous, transparent, and brilliant. It is capable of being rendered non-transparent or enamel-like. It is practically insoluble in hot or cold water. Its coefficient of expansion and contraction is approximately the same as glass, so that when applied it will not break or crack to pieces. It has the power of dissolving metallic oxids and salts to produce any desired colors. It unites chemically with glass and causes the designs or letters to be securely and permanently united therewith. It is capable of being removed from the glass. It is comparatively inexpensive to manufacture and may be applied at slight cost and without materially delaying the ordinary process of manufacture, and it is capable of fusion at a temperature not higher than the maximum temperature of the leers or annealing-ovens.

The preferred proportions of lead oxid and boric acid for the production of lead subborate are such as will contain the maximum quantity of lead to boric acid—that is to say, about 111.5 of lead oxid to thirty-one of crystallized boric acid or 17.5 of melted boric acid. If the proportion of lead is increased beyond that above stated, it comes down in the metallic condition, and hence would be useless for the purpose set forth. By increasing the proportion stated of boric acid the compound is rendered less fusible; but the proportion may be increased to some extent above the proportion stated without rendering the compound too infusible for the purpose stated. Hence I do not restrict myself to the precise relative proportions stated, as they may be varied within certain limits and yet insure the desired result.

Having fully described my invention, what I claim as new, and desire to secure by Letters Patent, is—

1. A composition of matter, for producing ornamentations on glass, resulting from the chemical reaction of lead oxid and boric acid, each in the proportions substantially as specified.

2. A composition of matter, for producing ornamentations on glass, resulting from the chemical reaction of lead oxid and boric acid, each in the proportions substantially as specified, and coloring material.

In testimony whereof I have signed this specification in the presence of two subscribing witnesses.

ROBERT KENNEDY DUNCAN.

Witnesses:
　GEO. F. DOWNING,
　S. G. NOTTINGHAM.